United States Patent [19]
Osswald et al.

[11] Patent Number: 5,301,547
[45] Date of Patent: Apr. 12, 1994

[54] AIR FLOW RATE METER

[75] Inventors: Bernd Osswald, Stuttgart; Thomas Schwegel, Vaihingen/Enz; Hans-Peter Stiefel, Ditzingen, all of Fed. Rep. of Germany

[73] Assignee: Robert Bosch GmbH, Stuttgart, Fed. Rep. of Germany

[21] Appl. No.: 948,550

[22] Filed: Sep. 23, 1992

[30] Foreign Application Priority Data

Sep. 26, 1991 [DE] Fed. Rep. of Germany ....... 4132050

[51] Int. Cl.$^5$ .................... G01M 19/00; G01P 5/00
[52] U.S. Cl. .................... 73/118.2; 73/202.5
[58] Field of Search .................. 73/118.2, 202.5, 202, 73/204.21

[56] References Cited

U.S. PATENT DOCUMENTS

| | | | |
|---|---|---|---|
| 4,393,697 | 7/1983 | Sato et al. | 73/118.2 |
| 4,515,014 | 5/1985 | Sumal | 73/202.5 |
| 4,517,837 | 5/1985 | Oyama et al. | 73/118.2 |
| 4,587,844 | 5/1986 | Sumal | 73/204.21 |
| 5,167,147 | 12/1992 | Peters et al. | 73/118.2 |

FOREIGN PATENT DOCUMENTS 9100987  1/1991  PCT Int'l Appl. ............... 73/118.2

Primary Examiner—Richard E. Chilcot, Jr.
Assistant Examiner—William L. Oen
Attorney, Agent, or Firm—Edwin E. Greigg; Ronald E. Greigg

[57] ABSTRACT

A flow rate meter for determining the mass or flow rate of flowing air, having a temperature-dependent measuring resistor disposed in an air bypass conduit. The air bypass conduit has a convergent portion in the region of the measuring resistor in which the air flow is accelerated. As a result of the air flow the effects of any air disturbances upon the measuring element are reduced. The following geometric relationships are advantageous: $l_1/l_5 > 3.8$, $l_4 > 1.5$, $l_1/l_3 > 2.0$, $l_4 > 9.0$, $l_5/l_s > 1.5$, $l_5/l_6 = 1.7$ to $1.9$, $b_1/b_s > 40.0$, $b_1/b_2 > 2.0$, $l_1/b_1 > 3.5$, and $l_5/b_3 = 5.5$ to $6$. The air flow rate meter is especially suitable for determining the mass or flow rate of aspirated air in mixture-compressing engines with externally supplied ignition as well as air-compressing, self-igniting engines.

3 Claims, 2 Drawing Sheets

AIR FLOW RATE METER

BACKGROUND OF THE INVENTION

The invention is based on an air flow rate meter for determining the mass, or flow rate, of a flowing medium.

U.S. Pat. No. 4,527,423 discloses an air flow rate meter for determining the mass of a flowing medium, in particular of the air aspirated by an internal combustion engine, which comprises a Venturi-like portion of a main flow conduit and an air bypass conduit that discharges into the main flow conduit in the flow direction in a narrowest cross section of the Venturi-like portion. A disadvantage in this arrangement is that the output signal of a temperature-dependent measuring resistor disposed in the air bypass conduit does not correspond, in every engine operating state, to the mass of air actually aspirated by the engine. Deviations from the output signal generated by the measuring resistor from the value corresponding to the air flow rate are caused by pulsations in the air flow when the throttle device is fully opened and by return flow effects of the portion of the aspirated air flowing through the air bypass conduit under certain load conditions. To avoid these measurement errors, an air bypass conduit is proposed in which the ratio of the flow length is 3:1 relative to the flow length of the main flow conduit.

In another known device for determining the mass or flow rate of the aspirated air, in which a temperature-sensitive measuring resistor is also disposed in an air bypass conduit, it has been found that the characteristic curve of the measuring resistor has an unfavorable course in some ranges, with a curvature that does not vary uniformly with an increasing flow rate of the medium. Ranges of constant slope alternate with those of variable slope. This characteristic is the result of a detachment zone that forms directly downstream of the measuring resistor and impedes the flow around the measuring resistor. This detachment zone, in which unsteady flow conditions, characterized by periodic vortex separations at a downstream trailing edge of the measuring resistor, prevail, is generally known as a Karman vortex street. From the negative pressure prevailing in the vortices, a flow that oscillates transversely to the main flow develops in the direction of the negative pressure regions, leading to the aforementioned wrong characteristic curve.

The disturbances in the flow around the measuring resistor that lead to the wrong characteristic curve do not occur in every operating state of the engine in the same way, and this limits the replicability of the characteristic curve of the measuring resistor. The quality of the output side of the measuring resistor is also lessened by signal noise superimposed on the output signal.

OBJECT AND SUMMARY OF THE INVENTION

The air flow rate meter according to the invention has an advantage over the prior art that the portion of the aspirated air flowing through the air bypass conduit is accelerated. The pressure drop associated with the acceleration of the air flow lessens the danger of flow separations. Flow separations that nevertheless do form, as a Karman vortex street, downstream of a measuring resistor are removed faster from it by the accelerated air flow, so that the effects of the vortex are kept away from the measuring resistor. As a result, the characteristic curve of the measuring resistor has a constantly variable curvature with increasing air flow rate. A geometric embodiment of the air bypass conduit to suit given measuring conditions results in especially disturbance-free flow around the measuring resistor.

The accelerated flow in the region of the measuring resistor causes the flow to be pressed against its surface, which improves the flow around the measuring resistor, and this is expressed in a substantially reduced strength of the signal noise superimposed on the output signal. Moreover, the replicability of the measuring resistor characteristic curve is improved by a lessening of the effects that interfere with the flow in the region of the measuring resistor.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
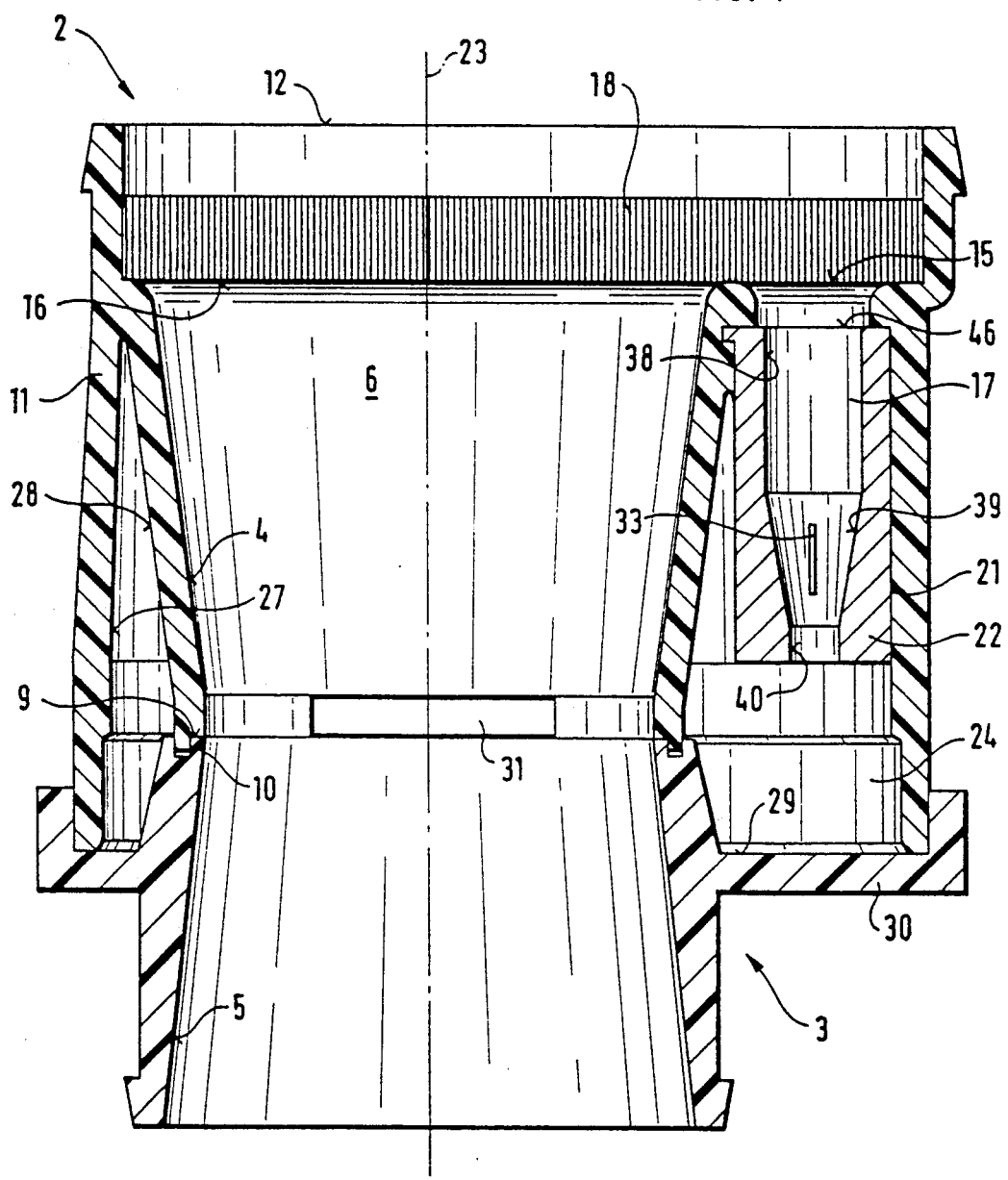
FIG. 1 is a section through a housing for an air flow rate meter, with an air bypass conduit embodied according to the invention.

In FIG. 1, the drawing shows a housing for an air flow rate meter, for instance for fuel injection systems of mixture-compressing internal combustion engines with externally supplied ignition; it has an upper housing part 2 and a lower housing part 3 joined to the upper housing part in a manner not shown in detail. The upper housing part 2 has an inner passage having a convergent nozzle-like portion 4, which is adjoined downstream by an inner passage having a divergent nozzle-like portion 5 in the lower housing part 3; the convergent portion 4, and the divergent portion 5 together form a Venturi-like main flow conduit 6. The convergent portion 4 of the upper housing part 2 is joined to the divergent portion 5 of the lower housing part 3 by a tongue-in-groove connection 10 that extends around a contacting face 9 of the two parts.

An inlet cross section 12 of the upper housing part 2 located upstream of the convergent portion 4 and forming part of an annular wall 11, and through which all the air, filtered by an air filter (not shown), flows is divided into a partial inlet cross section 16 for the convergent portion 4 and a partial inlet cross section 15 of an air bypass conduit 17 and is completely covered by a flow smoother 18.

The air bypass conduit 17 beginning at the partial inlet cross section 15 is formed for instance by a flow conduit insert 22, disposed in a recess 21 between the convergent portions 4 and the annular wall 11 and extending parallel to a flow conduit axis 23 of the upper and lower housings 2, 3. Adjoining the flow conduit body 22 in the flow direction of the aspirated air, there is an annular conduit 24, which is defined by an inner wall 27 of the annular wall 11, an outer wall 28 of the convergent portion 4, and a phase 29, oriented toward the upper housing part 2, of a radially extending flange 30 of the lower housing part 3 and which, for example in the form of a partly encompassing outflow opening 31, discharges into the Venturi-like main flow conduit 6, for instance into its narrowest cross section. A temperature-dependent measuring resistor 33, for instance a hot-film air flow rate meter, with an elongated flat substrate is disposed in the air bypass conduit 17 or in the flow conduit insert 22.

Figure 2:
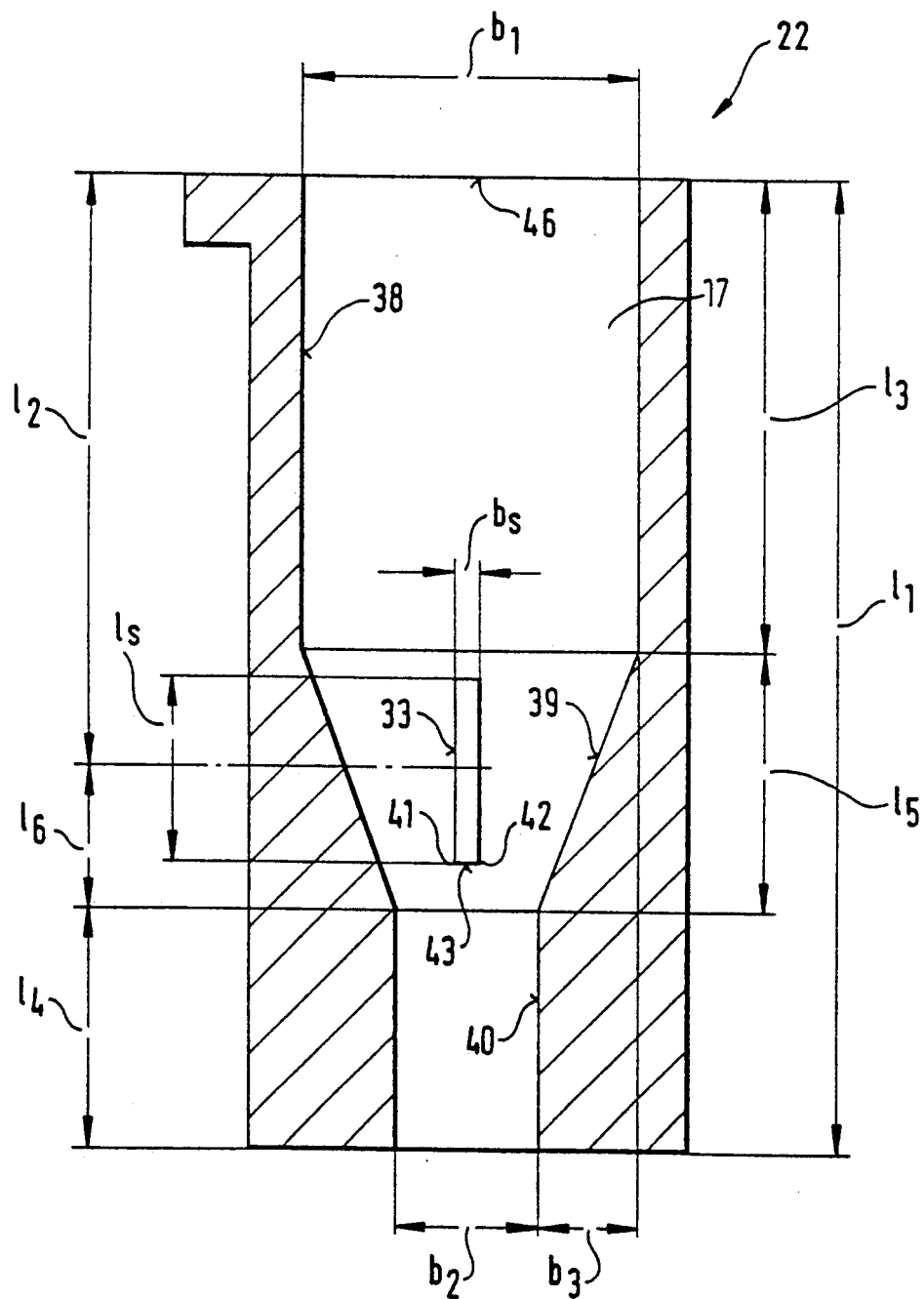
FIG. 2 shows the air bypass conduit according to the invention, on a larger scale.

In the air flow direction, the flow conduit insert 22 has a first portion 38 of constant flow cross section, which is adjoined by a convergent portion 39, which changes into a second portion 40 again of a smaller constant cross section; the measuring resistor 33 is disposed in the region of the convergent portion 39, for example in the middle of the flow cross section. Very good results are obtained, in which the disturbances in the flow around the measuring resistor that affect the measuring resistor are minimized, with the flow conduit insert 22 that meets the following geometric relationships: $l_1/l_s > 3.8$, $l_1/l_2 > 1.5$, $l_1/l_3 > 2.0$, $l_1 > 9.0$, $l_5/l_8 > 1.5$, $l_5/l_6 = 1.7$ to $1.9$, $b_1/b_s > 40.0$, $b_1/b_2 > 2.0$, $l_1/b_1 > 3.5$, and $l_5/b_3 = 5.5$ to $6$. In these ratios, $l_1$ is the total length of the flow conduit insert 22; $l_2$ is the length of an upstream inlet cross section 46 of the flow conduit insert 22 as far the center point of the measuring resistor 33; $l_3$ is the length of the first portion 38; $l_4$ is the length of the second portion 40; $l_5$ is the length of the convergent portion 39; $l_6$ is the length from the middle of the measuring resistor 33 to a downstream end of the convergent portion 39; $l_s$ is the length of the measuring element 33; $b_s$ is the width of the measuring resistor 33; $b_1$ is the width of the first portion 38; $b_2$ is the width of the second portion 40; and $b_3$ is half the difference between the width of the first portion 38 and that of the second portion 40. The significance of the various dimensions will become apparent from FIG. 2 of the drawing. Moreover, from the air bypass conduit 17 in the range of an air flow rate from 50 to 150 kg/h, a Reynolds number of approximately Re=4000 applies, referred to the measuring resistor length $l_s$.

The measuring resistor 33 represents a hindrance to the portion of the aspirated air flowing in the flow bypass conduit 17; it disturbs the air flow, especially the flow around the measuring resistor 33. The effects in particular of the separation zone that develops downstream of the measuring resistor 33, and in which unsteady flow conditions characterized by periodic vortex separations prevail, lead to an output signal that does not correspond to the mass or flow rate of the air flow. The vortices, in which because of the greater kinetic energy the pressure is below the level of the unimpeded flow, separate at edges 41, 42 of a downstream trailing face 43 of the measuring resistor 33 and flow along with the air flow in the direction of the second portion 40. A partial flow, oscillating transversely to the main flow, develops in the direction of the negative pressure zones.

The air aspirated by an engine, not shown, is cleaned by a filter element, not shown in further detail, and flows through the inlet cross section 12 into the housing 2, 3. A portion of the air mass corresponding to the total air mass aspirated flows through the partial inlet cross section 15 into the air bypass conduit 17, where it flows first through the first portion 38 of the flow conduit insert 22 that has a constant flow cross section. In the downstream convergent portion 39, the partial air flow is accelerated in accordance with the ratio of flow cross sections at the inlet and outlet of the convergent portion 39, and it then flows through the second portion 40 into the annular conduit 24, from which it flows from the outlet opening 31 into the Venturi-like main flow conduit 6.

Because of the acceleration of the flow in the convergent portion 39 of the flow conduit body 22, the static pressure along the convergent portion 39 drops, and the flow becomes less sensitive to separation effects at the surface of the measuring resistor 33. The vortices that nevertheless arise where the flow separates at the edges 41, 42 of the measuring resistor 33, and which float along with the air flow after they separate, move away from the measuring resistor 33 with approximately the same flow speed as the air. If the air flow speed in this portion is increased, then the dwell time of the vortices in the region near the measuring resistor decreases, so that the influence of the transverse flow that they cause upon the measuring resistor 33 is lessened.

Exact determination of the air mass or flow rate aspirated by the engine is a prerequisite for metering the fluid to match the aspirated air flow rate; suitable fuel metering in this way is necessary for the sake of optimal mixture formation from the standpoint of both smooth engine operation and exhaust emissions. The air flow rate meter according to the invention, because of the embodiment of the air bypass conduit according to the invention, permits very accurate measurement of the flow rate of the air aspirated by the engine and is thus especially suitable for use in fuel injection systems of mixture-compressing internal combustion engines having externally supplied ignition, as well as air-compressing, self-igniting internal combustion engines. The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An air flow rate meter for measuring an air mass or flow rate aspirated by an internal combustion engine, having a main flow conduit with a Venturi-shaped flow portion and having an air bypass conduit that has a first flow portion with a constant flow cross section, said air bypass conduit discharges into the main flow conduit in the flow direction in a region of a narrowest cross section of the Venturi-shaped flow portion as well as downstream thereof, and having a temperature-dependent measuring resistor disposed in the air bypass conduit, the air bypass conduit (17), adjoining the first portion (38) in the flow direction, has a convergent portion (39), in which the measuring resistor (33) is disposed, the convergent portion (39) is adjoined by a second portion (40) of constant flow cross section, and said second portion (40) is coaxial to said convergent portion (39).

2. An air flow rate meter as set forth in claim 1, in which a geometry of the air bypass conduit (17) varies in accordance with the following ratios: $l_1/l_s > 3.8$, $l_1/l_2 > 1.5$, $l_1/l_3 > 2.0$, $l_1/l_4 > 9.0$, $l_4/l_s > 1.5$, $l_5/l_6 = 1.7$ to $1.9$, $b_1/b_s > 40.0$, $b_1/b_2 > 2.0$, $l_1/b_1 > 3.5$, and $l_5/b_3 = 5.5$ to $6$, wherein $l_1$ is the total length of the flow conduit insert (22), $l_2$ is the length of an upstream inlet cross section (46) of the flow conduit insert (22) as far the center point of the measuring resistor (33), $l_3$ is the length of the first portion (38), $l_4$ is the length of the second portion (40), $l_5$ is the length of the convergent portion (39), $l_6$ is the length from the middle of the measuring resistor (33) to a downstream end of the convergent portion (39), $l_s$ is the length of the measuring element (33), $b_s$ is the width of the measuring resistor (33), $b_1$ is the width of the first portion (38), $b_2$ is the width of the second portion (40), and $b_3$ is half the difference between the width of the first portion (38) and that of the second portion (40).

3. An air flow rate meter as defined by claim 2, in which a Reynolds number of approximately $Rs=4000$ applies to the air bypass conduit (17), when the measuring resistor (33) has a length $l_s$ and measured air throughput of from 50 to 150 kg/h.

* * * * *